June 26, 1962  E. F. WILSON  3,041,026
SACK CART
Filed April 27, 1959
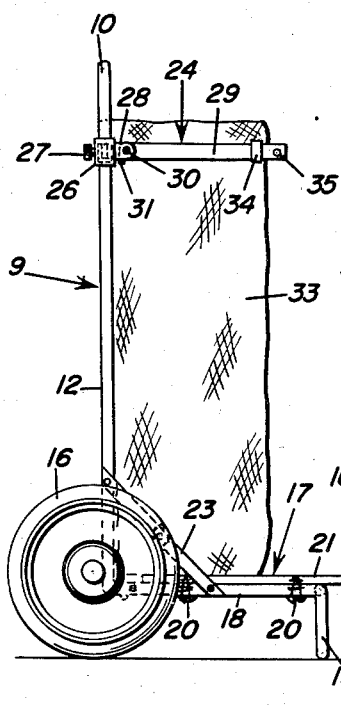
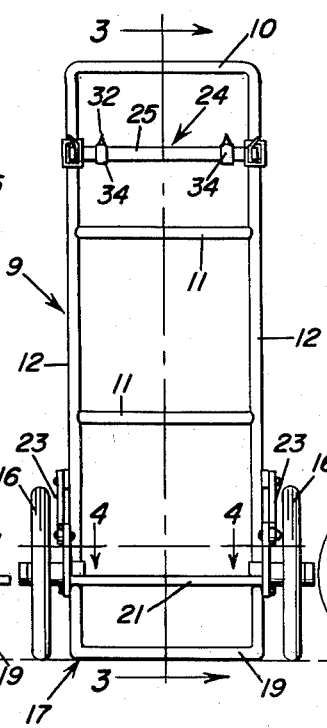
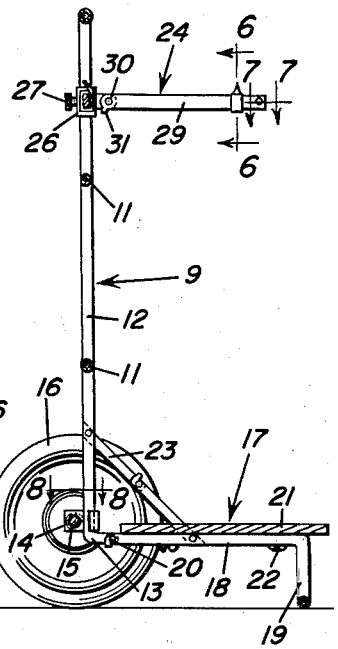
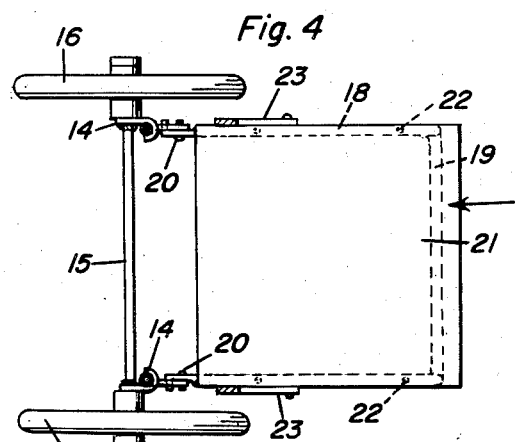
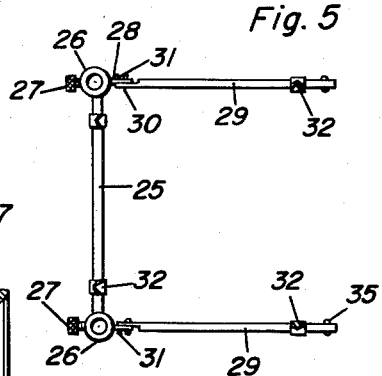
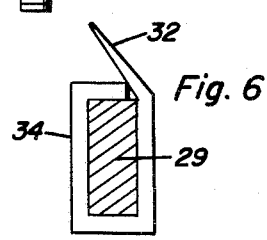
Earl F. Wilson
INVENTOR.

United States Patent Office 3,041,026
Patented June 26, 1962

3,041,026
SACK CART
Earl F. Wilson, Portland, Oreg.
(5137 Big Ranch Road, Napa, Calif.)
Filed Apr. 27, 1959, Ser. No. 809,084
4 Claims. (Cl. 248—98)

This invention relates to new and useful improvements in sack carts to be used particularly when harvesting beans, walnuts, etc., and has for its primary object to provide, in a manner as hereinafter set forth, a device of this character which is adapted to hold the sack open to receive the crop and which may then be utilized for transporting the filled sack to any desired location.

Another very important object of the present invention is to provide a cart of the character described which may readily be adjusted to handle sacks of various sizes.

Still another object of the invention is to provide a sack cart of the character described which may be compactly folded when not in use.

Other objects of the invention are to provide a sack cart of the character set forth which will be comparatively simple in construction, strong, durable, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in side elevation of a cart constructed in accordance with the present invention, showing a sack mounted thereon;

FIGURE 2 is a view in front elevation of the device;

FIGURE 3 is a vertical sectional view taken substantially on the line 3—3 of FIGURE 2;

FIGURE 4 is a view in horizontal section taken substantially on the line 4—4 of FIGURE 2;

FIGURE 5 is a top plan view of the vertically adjustable sack hanger or rack;

FIGURE 6 is an enlarged detail view in transverse section, taken substantially on the line 6—6 of FIGURE 3;

FIGURE 7 is an enlarged detail view in horizontal section, taken substantially on the line 7—7 of FIGURE 3; and FIGURE 8 is a fragmentary view in horizontal section through a lower, side portion of the device, taken substantially on the line 8—8 of FIGURE 3.

Referring now to the drawing in detail, it will be seen that the embodiment of the invention which has been illustrated comprises a substantially inverted U-shaped frame of suitable tubular metal which is designated generally by reference character 9. The intermediate or bight portion of the frame 9 provides a handle 10. Braces 11 extend between the legs 12 of the frame 9 at vertically spaced points. The legs 12 terminate in forwardly extending lower end portions 13.

Secured horizontally as by welding on the lower portions of the frame legs 12 are apertured, rearwardly extending, substantially J-shaped brackets 14. A transverse axle 15 is fixed in the openings provided therefor in the brackets 14. The axle 15 projects beyond the sides of the frame 9 and supporting wheels 16 are journalled on the end portions of said axle.

Mounted for swinging movement in a vertical plane on the lower portion of the frame 9 is a foldable base or support which is designated generally by reference character 17. The base 17 includes a generally U-shaped, tubular frame 18 comprising a right angularly downwardly bent intermediate portion providing a substantially U-shaped leg 19 for supporting the free end of the base in elevated position. The end portions of the substantially U-shaped frame 18 are pivotally connected at 20 to the lower end portions 13 of the legs 12 of the frame 9. A platform 21 is secured by screws or bolts 22 on the frame 18. Breakable or foldable braces 23 extend between the frame 9 and the frame 18 for supporting the base 17 at right angles to said frame 9 when the cart is tilted to an inclination in the usual manner when transporting the load.

Mounted for vertical sliding adjustment on the upper portion of the frame 9 is a substantially U-shaped sack hanger or rack which is designated generally by reference character 24. The sack hanger 24 comprises a transverse bar 25 having fixed on its ends sleeves 26 which are slidable on the legs 12 of the frame 9. Setscrews 27 are threadedly mounted in the sleeves 26 and engageable with the frame legs 12 for frictionally securing the hanger 24 in adjusted position. Projecting forwardly from the sleeves 26 are ears or lugs 28. In the embodiment shown, foldable arms 29 are pivotally secured, as at 30, for vertical swinging movement on the ears 28. The pivoted end portions of the arms 29 include stops 31 which are engageable beneath the ears 28 for limiting the downward swinging movement of said arms and supporting the same in a horizontal, operative position.

The hanger 24 further comprises upwardly and outwardly inclined hooks or prongs 32 on which the mouth portion of the sack, as indicated at 33, is impaled. The prongs 32 comprise loops or the like 34 (see FIGURE 6) which are slidable on the members 25 and 29 of the hanger 24. Stops 35 are provided on the free end portions of the arms 29 for the respective prongs 32.

It is thought that the use or operation of the cart will be readily apparent from a consideration of the foregoing. Briefly, with the bottom of the sack 33 resting on the platform 21 of the base 17, the upper or mouth portion of said sack is inserted in the hanger or rack 24 and impaled on the prongs 32. With the mouth of the sack thus held open wide, said sack may be rapidly filled by the picker in an obvious manner. By reason of the adjustability of the hanger or rack 24 and the prongs 32 thereon the device will readily accommodate sacks of various sizes. When the sack has been filled the cart is tipped to an inclination and pulled through the medium of the handle 10 to the desired point for unloading. When the cart is not in use it may be compactly folded by simply "breaking" the braces 23, swinging the base 17 upwardly on the pivots 20 to a position parallel to the frame 9, lowering the hanger 24 on said frame and then swinging the arms 29 upwardly. For simplicity of construction and economy of manufacture, the folding feature may be omitted.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A sack cart comprising a generally inverted U-shaped tubular frame including spaced, parallel legs and a bight portion connecting the upper ends of said legs and providing a handle, supporting wheels on the legs, said legs comprising right angularly bent, elevated free end portions, a foldable sack supporting base hingedly mounted for vertical swinging movement on the frame, said base comprising a generally U-shaped tubular frame comprising legs having the free ends thereof pivotally connected to said free end portions of the first named legs, a platform secured on the second named legs, said second named frame further comprising a downwardly right angularly bent, generally U-shaped intermediate portion providing a leg for supporting the free end of the base, and a hanger on the upper portion of the first named frame for supporting the mouth of a sack in an elevated position, said hanger including horizontal arms, split loops mounted for sliding adjustment on said arms, and frictionally gripping same, and sack-penetrating prongs on one end of said loops.

2. A foldable sack cart comprising, in combination, a generally inverted U-shaped frame including a pair of spaced, parallel legs and a bight portion connecting the upper ends of said legs and providing a handle, a foldable sack supporting base hingedly mounted on the free ends of the legs, supporting wheels on the lower portion of the frame, and a foldable, generally U-shaped sack hanger mounted for vertical adjustment on the upper portion of the frame, said hanger comprising a horizontal bar, bearings on the ends of said bar slidable on the legs, horizontal arms hingedly mounted on the bearings at right angles to the bar and foldable to closely parallel the legs when the hanger is in a lowered position on the frame, split resilient loops slidable on the arms, and sack-penetrating prongs on one end of said loops, and set-screws in the bearings engageable with the legs for securing the hanger in adjusted position.

3. A foldable sack cart comprising a pair of generally U-shaped, one-piece tubular frames hingedly connected at their ends, supporting wheels on one of the frames, a sack hanger on said one frame, and a platform mounted on the other frame beneath said hanger, said other frame including a right angularly downwardly bent bight portion for supporting one end of the platform in an elevated position, said hanger comprising a pair of horizontal arms mounted for vertical sliding adjustment on the legs of said one frame, split resilient loops mounted for sliding adjustment on said arms, and sack-penetrating prongs on one end of said loops.

4. A foldable sack cart comprising a pair of generally U-shaped, one-piece tubular frames hingedly connected at their ends, supporting wheels on one of the frames, a sack hanger on said one frame, said hanger comprising a pair of horizontal arms mounted for vertical sliding adjustment on the legs of said one frame, split resilient loops mounted for sliding adjustment on said arms, sack-penetrating prongs on one end of said loops, and a platform on the other frame beneath the hanger.

References Cited in the file of this patent

UNITED STATES PATENTS

| | | |
|---|---|---|
| 195,732 | Tobien | Oct. 2, 1877 |
| 398,817 | Burrage | Mar. 5, 1889 |
| 553,455 | Evered | Jan. 21, 1896 |
| 779,124 | Haffey | Jan. 3, 1905 |
| 1,679,450 | Thompson | Aug. 7, 1928 |
| 1,718,962 | Kimball | July 2, 1929 |
| 1,802,437 | McHugh | Apr. 28, 1931 |
| 1,923,816 | Firl | Aug. 22, 1933 |
| 2,434,140 | Bernstein | Jan. 6, 1948 |
| 2,455,729 | Byers | Dec. 7, 1948 |
| 2,745,673 | Koepke | May 15, 1956 |
| 2,786,692 | Timpson | Mar. 26, 1957 |
| 2,845,278 | Breeler | July 29, 1958 |
| 2,868,558 | Krauss | Jan. 13, 1959 |

FOREIGN PATENTS

| | | |
|---|---|---|
| 234,682 | Great Britain | June 4, 1924 |